(12) United States Patent
Yong et al.

(10) Patent No.: US 7,700,226 B2
(45) Date of Patent: Apr. 20, 2010

(54) FUNCTIONAL POLYMER FILM-COATED ELECTRODE AND ELECTROCHEMICAL DEVICE USING THE SAME

(75) Inventors: Hyun Hang Yong, Seoul (KR); Sang Young Lee, Daejeon (KR); Seok Koo Kim, Daejeon (KR); Soon Ho Ahn, Daejeon (KR); Byung Hoon Oh, Seoul (KR)

(73) Assignee: LG Chem, Ltd., Seoul (KR)

( * ) Notice: Subject to any disclaimer, the term of this patent is extended or adjusted under 35 U.S.C. 154(b) by 110 days.

(21) Appl. No.: 10/981,693

(22) Filed: Nov. 5, 2004

(65) Prior Publication Data

US 2005/0118508 A1    Jun. 2, 2005

(30) Foreign Application Priority Data

Nov. 5, 2003    (KR) .................. 10-2003-0077957
Dec. 8, 2003    (KR) .................. 10-2003-0088484

(51) Int. Cl.
*H01M 2/16*    (2006.01)

(52) U.S. Cl. ............... 429/128; 429/246; 429/217; 429/338; 429/342; 429/337; 29/623.5

(58) Field of Classification Search ........... 429/128, 429/246, 217, 338, 342, 337, 623.5
See application file for complete search history.

(56) References Cited

U.S. PATENT DOCUMENTS

| | | | |
|---|---|---|---|
| 5,677,083 A * | 10/1997 | Tomiyama | 429/231.3 |
| 5,700,442 A | 12/1997 | Bloch et al. | |
| 6,291,102 B1 * | 9/2001 | Yoshida et al. | 429/231.95 |
| 6,475,678 B1 * | 11/2002 | Suzuki | 429/306 |
| 6,509,123 B1 | 1/2003 | Shibuya et al. | |
| 2003/0113627 A1 | 6/2003 | Choi et al. | |
| 2004/0029014 A1 | 2/2004 | Hwang et al. | |
| 2004/0131934 A1 * | 7/2004 | Sugnaux et al. | 429/209 |

(Continued)

FOREIGN PATENT DOCUMENTS

EP    0 858 120 A2    8/1998

(Continued)

*Primary Examiner*—Jane Rhee
(74) *Attorney, Agent, or Firm*—Birch Stewart Kolasch & Birch, LLP

(57) ABSTRACT

The present invention provides an electrode in which an electrode active material particles as being interconnected are applied on current collector, wherein the interconnected surface of electrode active material particles is coated with a polymer, the polymer being present as an independent phase, while maintaining a pore structure formed among the interconnected electrode active material particles as well as an electrochemical device including the electrode. Also, the present invention provides a method for manufacturing an electrode coated with a polymer present on an interconnected surface of electrode active material as an independent phase, while maintaining a pore structure formed among the electrode active material particles, which comprises the steps of: (a) coating slurry for an electrode including an electrode active material on a current collector and drying it to form an electrode; and (b) dipping the electrode obtained from step (a) into a solution containing the polymer dissolved therein and a method for manufacturing an electrochemical device comprising the electrode obtained by the above method.

The electrode coated with a polymer as an independent phase provides an electrochemical device with improved safety and prevents degradation of performance of an electrochemical device.

15 Claims, 5 Drawing Sheets

U.S. PATENT DOCUMENTS

2005/0175903 A1  8/2005  Kim et al.

FOREIGN PATENT DOCUMENTS

| | | |
|---|---|---|
| EP | 1 077 498 A1 | 2/2001 |
| JP | 10-50348 A | 2/1998 |
| JP | 2000-299129 A | 10/2000 |
| JP | 2002-373643 A | 12/2002 |
| JP | 2003-197196 A | 7/2003 |
| KR | 10-0366344 B1 | 12/2002 |

* cited by examiner (a)

(b)

● Electrolyte-insoluble polymer
● Electrolyte-functional polymer

FUNCTIONAL POLYMER FILM-COATED ELECTRODE AND ELECTROCHEMICAL DEVICE USING THE SAME

TECHNICAL FIELD

The present invention relates to an electrode that can improve safety of a battery and prevent degradation of battery performance, a method for manufacturing the same, an electrochemical device comprising the same and a method for manufacturing the same device. More particularly, the present invention relates to an electrode obtained by coating an electrolyte-functional polymer that can be swelled and/or solubilized by a liquid electrolyte on the surface of an electrode active material as an independent phase, while maintaining a pore structure among the electrode active material particles, so as to improve safety of an electrochemical device and to prevent degradation of quality of an electrochemical device. The present invention also relates to an electrochemical device comprising the electrode as described above.

BACKGROUND ART

Recently, there is an increasing interest in energy storage technology. Batteries have been widely used as energy sources in portable phones, camcorders, notebook computers, PCs and electric cars, resulting in intensive research and development into them. In this regard, electrochemical devices are subjects of great interest. Particularly, development of rechargeable secondary batteries is the focus of attention. Recently, research and development into novel electrode and battery that can improve capacity density and specific energy have been developed intensively in the field of secondary batteries.

Among currently used secondary batteries, lithium secondary batteries appearing in early 1990's have drive voltage and energy density higher than those of conventional batteries using aqueous electrolytes (such as Ni-MH batteries, N—Cd batteries, $H_2SO_4$—Pb batteries, etc). For these reasons, lithium secondary batteries are advantageously used. However, such lithium secondary batteries have disadvantages in that organic electrolytes used therein may cause safety-related problems resulting in ignition and explosion of the batteries and that processes for manufacturing such batteries are complicated. The latest lithium ion polymer batteries improve the above disadvantages of lithium ion secondary batteries and are expected to be the most prominent candidate leading the next-generation battery technology. However, lithium ion polymer batteries generally have lower battery capacity compared to lithium ion secondary batteries. Particularly, they have insufficient discharge capacity at low temperature. Therefore, there is a need of improvement in such problems.

It is very important to evaluate and secure the battery safety. The most important consideration is that batteries should not cause damages to users upon miss-operation of the batteries. For this purpose, safety standards for the batteries strictly restrict firing and explosion in the batteries. Thus, many methods to solve the battery safety problem are being proposed.

Particularly, as a more fundamental solution for battery safety, use of polymer electrolytes has been suggested. Generally, battery safety increases in order of liquid electrolytes, gel-type electrolytes and solid polymer electrolytes, while battery performance decreases in the same order as described above. Therefore, it is known that batteries using solid electrolytes have not yet been commercialized due to such poor battery performance. Meanwhile, commercially applicable gel-type polymer electrolytes are recently developed by Sony Corp. and Sanyo Electric Co. Ltd. in Japan, and are disclosed in U.S. Pat. No. 6,509,123 B1 and Japanese Laid-Open Patent No. 2000-299129, respectively. Batteries using such gel-type polymer electrolytes are also produced. The characteristics of the above-mentioned two types of batteries will be described hereinafter briefly.

The Sony's batteries use a polymer such as PVDF-HFP (polyvinylidene fluoride-hexafluoropropylene) and an electrolyte containing $LiPF_6$ dissolved in EC (ethylene carbonate) and PC (propylene carbonate). The polymer and electrolyte are mixed with DMC (dimethyl carbonate) as a solvent to form a mixture, and then the mixture is coated on the surface of an electrode, followed by volatilization of DMC, thereby providing an electrode having gel-type polymer thereon. Next, the electrodes are wound together with a polyolefin-based separator for preventing electric short circuit, thereby providing a battery.

Meanwhile, in the case of the Sanyo's batteries, a cathode, an anode and a polyolefin-based separator are wound to form a cell, in the first place. Then, PVDF (polyvinylidene fluoride), PMMA (polymethyl methacrylate), PEGDMA (polyethyleneglycol dimethacrylate) and an initiator are blended with a mixture of organic carbonates. Next, the resultant mixture is injected into the previously formed cell and then is crosslinked under suitable conditions, thereby forming a gel-type polymer electrolyte. In this case, the in-situ formation of the electrolyte is made inside of a battery after assemblage of a battery.

However, it is shown that processes for preparing the above two types of gel-type polymer electrolytes are very complicated and thus provide poor productivity. Moreover, the above two-types of electrolytes result in only limited improvement in battery performance and safety.

As another approach to improve battery safety, Korean Patent Publication No. 0366344 discloses a method of coating a conductive polymer on the surface of an electrode active material. However, in this case, there are problems in that electrode active material particles coated with conductive polymers tend to aggregate, and that the conductive polymers may be separated from the surface of the electrode active material due to the solvents and shear force used in the following steps for manufacturing an electrode. Additionally, although conductive polymers permit electron movement, lithium ion movement is highly limited, thereby causing degradation of battery performance.

BRIEF DESCRIPTION OF THE DRAWINGS

The foregoing and other objects, features and advantages of the present invention will become more apparent from the following detailed description when taken in conjunction with the accompanying drawings in which:

FIGS. 2a and 2b are views for comparison of polymer-coated electrodes, wherein FIG. 2a is a schematic view showing an electrode partially coated with a polymer according to the prior art, and FIG. 2b is a schematic view showing an electrode coated with a polymer as an independent phase according to the present invention;

DISCLOSURE OF THE INVENTION

Figure 1:
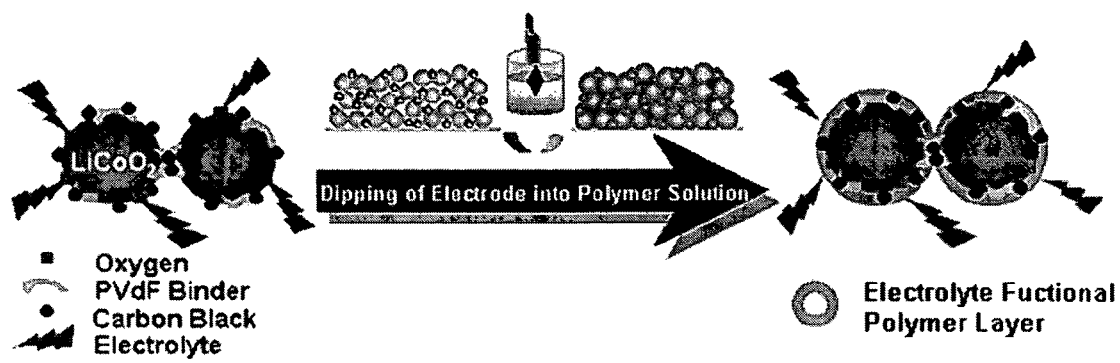
FIG. 1 is a schematic view showing a process for manufacturing an electrode coated with a polymer as an independent phase and the structure of electrode active material formed thereby, according to the present invention.

We have found that when an electrode obtained by a conventional method is dipped into a polymer solution so as to form a polymer coating layer coated on the surface of an electrode active material as an independent phase, while maintaining the pore structure formed by spaces among the electrode active material particles, it is possible to solve the problems occurring in the prior art, including aggregation of electrode active material particles and separation of the polymer coating layer as well as to obtain the effects of preventing degradation of battery performance and improving battery safety.

Therefore, it is an object of the present invention to provide an electrode that can improve safety of a battery and prevent degradation of battery performance, a method for manufacturing the same, an electrochemical device comprising the same and a method for manufacturing the same device.

According to an aspect of the present invention, there is provided an electrode in which an electrode active material particles as being interconnected are applied on current collector, wherein the interconnected surface of electrode active material particles is coated with a polymer, the polymer being present as an independent phase, while maintaining a pore structure formed among the interconnected electrode active material particles. There is also provided an electrochemical device, preferably a lithium secondary battery, including the same electrode.

According to another aspect of the present invention, there is provided a method for manufacturing an electrode comprising the steps of: (a) coating slurry for an electrode containing an electrode active material on a current collector and drying the slurry to form an electrode; and (b) dipping the electrode obtained in step (a) into a solution containing a polymer dissolved therein, so that a polymer coating layer can be formed on the interconnected surface of the electrode active material as an independent phase, while maintaining the pore structure formed among the electrode active material particles. There is also provided a method for manufacturing an electrochemical device including the electrode obtained by the same method as described above.

Hereinafter, the present invention will be explained in detail.

Generally, an electrode formed by a conventional method includes an electrode active material bonded and fixed to a collector by means of a binder. According to the present invention, the above-mentioned electrode is dipped into a solution containing a polymer, preferably an electrolyte-functional polymer that can be swelled and/or solubilized by a liquid electrolyte, thereby coating the electrode with the polymer.

The polymer solution easily infiltrates through the pore structure formed among the electrode active material particles in the electrode and into the inner part of the electrode. Therefore, it is possible to coat the interconnected surface of the electrode active material with a thin and uniform layer, while maintaining the pore structure among the electrode active material particles (see FIG. 1). In the electrode coated with an electrolyte-soluble polymer according to the prior art, the electrolyte-soluble polymer coating layer is present on the surface of the electrode active material as a phase mixed with a binder (see FIG. 2a) On the contrary, in the electrode coated with a polymer according to the present invention, the polymer coating layer is present as an independent single phase (see FIG. 2b).

Due to the above structural characteristics, the electrode according to the present invention can improve battery safety and prevent degradation of battery performance at the same time.

First, the electrode according to the present invention, in which the interconnected surface of electrode active material is coated with a polymer as an independent phase, while maintaining the pore structure formed among the electrode active material particles, can improve the safety of a battery. Namely, conventional electrodes tend to react with a highly reactive electrolyte when they become unstable due to extreme conditions such as overcharge or high-temperature storage. However, according to the electrode of the present invention, because the surface of electrode active material in the electrode is coated with a polymer present in the form of an independent phase, the electrode active material contacts not with an electrolyte but still with the polymer, even after the injection of liquid electrolyte in assembling a battery. Therefore, it is possible to significantly prevent side reactions between the electrode active material and electrolyte occurring under extreme conditions such as overcharge or high-temperature storage. Further, it is possible to reduce the heat value generated from side reactions between the electrode and liquid electrolyte and to inhibit formation of dendrite on the electrode surface, thereby improving battery safety significantly.

Additionally, the electrode according to the present invention is obtained by forming an electrode according to a conventional method and then dipping the formed electrode into a polymer-containing solution so as to be coated with the polymer. Contrary to this, a conventional polymer-coated electrode is formed by coating an electrode active material with a conductive polymer or an inorganic substance and then forming an electrode by using the coated active material. Therefore, it is possible to prevent aggregation of an electrode active material or separation of a binder coated on an electrode active material, while substantially maintaining the distribution and structure in materials forming an electrode. Further, it is possible to maintain fundamental physical properties of a battery (including battery capacity and battery performance), and structural stability of a battery for a long time.

Figure 3:
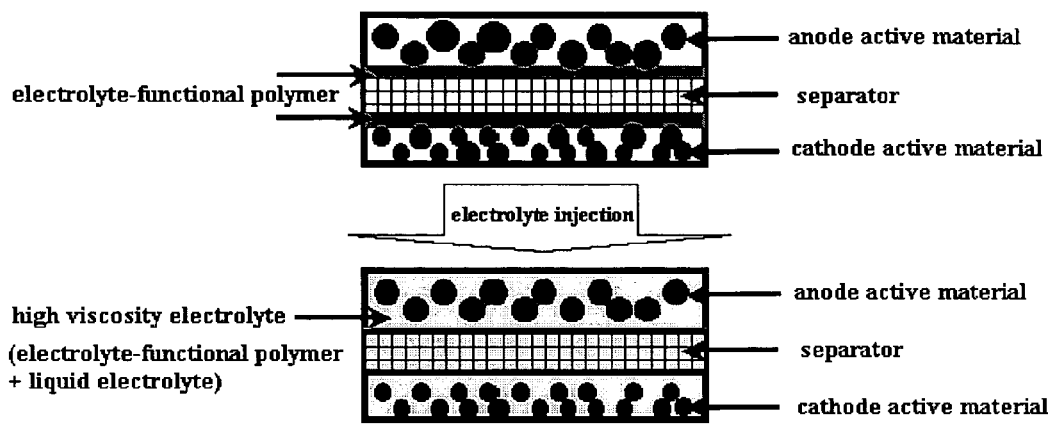
FIG. 3 is a schematic view illustrating a state wherein a high-viscosity electrolyte, formed by dissolution of the polymer coated on the surface of electrode active material as an independent phase upon injection of a liquid electrolyte, is uniformly distributed in electrodes and a separator.

Moreover, when the polymer coated on the interconnected surface of electrode active material as an independent phase is an electrolyte-functional polymer that can be swelled or solubilized by a liquid electrolyte, it is possible to improve battery safety. More particularly, the electrolyte-swellable and/or electrolyte-soluble polymer, preferably electrolyte-soluble polymer is dissolved by an electrolyte injected after assemblage of a battery, thereby forming an electrolyte present in the form of liquid-like gel or high-viscosity liquid (see FIG. 3). Such electrolyte has advantages both of liquid electrolytes and gel-type electrolytes. Namely, oxygen generated by the collapse of a cathode structure due to conditions such as overcharge and high-temperature storage can react with the electrolyte having relatively high viscosity as described above, thereby inhibiting side reactions between the electrode and electrolyte. Ultimately, it is possible to reduce the calorific value generated from the side reactions and to improve battery safety.

Second, the electrode according to the present invention, in which the interconnected surface of electrode active material is coated with a polymer as an independent phase, while maintaining the pore structure. formed among the electrode active material particles, can minimize degradation of battery performance. Namely, because the electrode according to the invention has a polymer coating layer formed by dipping a preformed electrode into a polymer-containing solution, the pore structure among the electrode active material particles is maintained so that electrolytes can infiltrate into the electrode promptly to the inner part of the electrode. Moreover, such a thin polymer coating layer that has a thickness of 1 µm or less minimizes decrease of the moving rate of lithium ions.

Further, when the polymer coated on the interconnected surface of the active material as an independent phase is an electrolyte-functional polymer that can be swelled or solubilized by a liquid electrolyte, it is possible to prevent degradation of battery performance. More particularly, when the polymer used in the present invention is an electrolyte-functionalized polymer that can be swelled and/or solubilized by an electrolyte, the electrolyte injected after assemblage of a battery can infiltrate into the polymer and the resultant polymer containing the electrolyte infiltrated therein has a capability of conducting electrolyte ions. Therefore, contrary to conventional conductive polymers or inorganic substances having no electrolyte ion conductivity, the polymer according to the present invention, preferably electrolyte-swellable and/or electrolyte-soluble polymer can prevent degradation of battery performance. Additionally, the electrolyte-swellable and/or electrolyte-soluble polymer has excellent affinity to electrolytes, the electrode coated with the same polymer also has increased affinity to electrolytes and thus is expected to improve battery performance. Further, when the polymer is applied to carbonaceous anode active materials, irreversible capacity of an anode can be decreased, thereby providing an increase in the total capacity of a battery.

Additionally, when the polymer coated on the interconnected surface of electrode active material as an independent phase is an electrolyte-soluble polymer, the polymer is dissolved in an electrolyte injected into a battery to form a high-viscosity electrolyte as described above. Such high-viscosity electrolytes not only provide a minute decrease in ion conductivity according to an increase in viscosity but also infiltrate into and distribute in the surfaces of both electrodes, pores thereof, the surface of electrode active materials in the electrode, the surface of a separator and pores thereof, resulting in occurrence of battery reactions caused by lithium ion transfer over the total volume of the battery, followed by improvement in the battery performance.

It is preferable that the polymer coated on the surface of an electrode, preferably on the interconnected surface of electrode active material has a dielectric constant as high as possible. Because dissociation degree of salts in an electrolyte depends on the dielectric constant of a solvent used in the electrolyte, the polymer having a higher dielectric constant can increase the dissociation degree of salts in the high-viscosity electrolyte formed through the dissolution of the polymer. The dielectric constant of the polymer may range from 1.0 to 100 (measured at a frequency of 1 kHz), and is preferably 10 or more.

According to the present invention, the polymer coated on the surface of an electrode, preferably on the interconnected surface of the electrode active material may be a soluble, swellable or insoluble polymer, or a polymer having mixed properties, depending on the kind of liquid electrolyte to be used. Particularly, electrolyte-soluble and/or electrolyte-swellable polymers are particularly preferred. The soluble, swellable or insoluble polymer, or polymer having mixed properties coated on the surface of electrode active material can inhibit side reactions between electrode active material and electrolyte and thus can improve battery safety.

When the polymer is an electrolyte-swellable and electrolyte-soluble polymer having excellent affinity to electrolytes, the electrode coated with the same polymer also has increased affinity to electrolytes, thereby improving battery performance. Particularly, an electrolyte-swellable polymer absorbs a liquid electrolyte injected after assemblage of a battery and thus has electrolyte ion conductivity, thereby improving battery performance. Additionally, an electrolyte-soluble polymer is dissolved by an electrolyte injected after assemblage of a battery to form a high-viscosity electrolyte having advantages both of liquid electrolytes and gel-type electrolytes, thereby improving safety of a battery as well as preventing degradation of battery performance.

When an electrolyte-swellable polymer and an electrolyte-soluble polymer is used as a mixture, the above-described effects are synergistically combined to improve battery safety as well as to prevent degradation of battery performance.

Among the above polymers, the electrolyte-insoluble polymers that may be used in the present invention have a solubility parameter of 18.0 ($J^{1/2}/cm^{3/2}$) or less. When the solubility parameter of a polymer is 18 or less, the polymer cannot be dissolved in a conventional liquid electrolyte for a battery.

The electrolyte-swellable and electrolyte-soluble polymers that may be used in the present invention have a solubility parameter of 18.0 ($J^{1/2}/cm^{3/2}$) or more, preferably of between 18.0 ($J^{1/2}/cm^{3/2}$) and 30 ($J^{1/2}/cm^{3/2}$).

Particular examples of the electrolyte-swellable polymer include polyethylene oxide, polyvinylidene fluoride-hexafluoropropylene, polyvinylidene fluoride-trichloroethylene, polymethyl methacrylate, polyacrylonitrile, polyacrylonitrile-styrene copolymer, polyvinyl chloride (PVC), polyvinyl pyrrolidone, polyvinyl acetate, polyethylene-vinyl acetate copolymer, gelatin or mixtures thereof, but are not limited thereto.

Particular examples of the electrolyte-soluble polymer include cyano group(—CN)-containing polymers, pullulan, cellulose acetate, cellulose acetate butyrate, cellulose acetate propionate, polyethylene glycol, glyme, polyethyleneglycol dimethylether, poly pyrrolidone or mixtures thereof, but are not limited thereto. Cyano group-containing polymers are particularly preferred and particular examples thereof include cyanoethyl pullulan, cyanoethyl polyvinyl alcohol, cyanoethyl cellulose, cyanoethyl sucrose, etc. Any materials having the above-described characteristics may be used alone or in combination.

The polymer coating layer coated on the surface of an electrode, preferably on the interconnected surface of electrode active material, as an independent phase has a thickness preferably of between 1 nm and 1 μm and more preferably of between 10 nm and 100 nm. When the thickness is less than 1 nm, it is not possible to efficiently prevent side reactions and exothermic reactions between electrode active material and electrolyte predominantly occurring under overcharging or high-temperature storage conditions. Therefore, it is not possible to improve the safety of a battery. When the thickness is more than 1 μm, it takes a long time for the polymer to be swelled or solubilized by infiltration of electrolyte and lithium ion conductivity reduces, thereby degrading the performance of a battery.

The amount of the polymer present on the surface of electrode active material may be varied considering the relationship between battery performance and safety. Preferably, the amount of the polymer ranges from 0.01 wt % to 50 wt % based on the weight of the electrode active material. Further, the amount of the polymer can be controlled independently in a cathode or an anode.

The electrode including a polymer coated on the surface of electrode active material as an independent phase has reduced porosity compared to the electrode not including the polymer. After coating the polymer, the porosity resulting from the spaces formed among the electrode active material particles is preferably controlled in the range of between 1% and 50%. Pores of an electrode are the portions in which electrolyte is filled. When the porosity of the electrode is less than 1%, the ratio of electrolyte (E) to electrode active material (M), i.e. E/M is too low, thereby detracting from battery performance due to insufficient lithium ion transfer. When the porosity of the electrode is more than 50%, side reactions between electrolyte and electrode active material progress excessively under overcharging or high-temperature storage conditions, thereby detracting from battery safety.

Additionally, when the polymer is an electrolyte-swellable and/or electrolyte-soluble polymer, the electrode coated with the same polymer has increased affinity to liquid electrolytes, and thus the contact angle between the electrode and liquid electrolyte to be used decreases. The contact angle preferably decreases by 1° or more compared to the electrode not including the polymer.

The electrode that has a polymer coating layer present on the surface of an electrode active material as an independent phase, while maintaining the pore structure among interconnected particles of the electrode active material, can be manufactured by the following methods.

In one embodiment, a conventional method well known to one skilled in the art is used to form an electrode. Particularly, electrode slurry including an electrode active material, optionally with a binder and/or conductive agent is coated on a current collector and then dried. Next, as shown in FIG. 1, the electrode is dipped into a solution in which a polymer, preferably an electrolyte-swellable and/or electrolyte-soluble polymer is dispersed or dissolved, thereby coating the electrode with the polymer, and then the solvent is volatilized and dried.

Although there is no particular limitation in the above solvent, it is preferable that the solvent has a solubility parameter similar to that of the polymer to be used and a low boiling point. Such solvents can be mixed uniformly with the polymer and can be removed easily after coating the polymer. Solvents that may be used include acetone, tetrahydrofuran, methylene chloride, chloroform, dimethylformamide, N-methyl-2-pyrrolidone(NMP), cyclohexane, water or mixtures thereof, but are not limited thereto.

In order to coat an electrode with the polymer solution prepared as described above, any methods known to one skilled in the art may be used. It is possible to use various processes including dip coating, die coating, roll coating, comma coating or combinations thereof.

Figure 2:
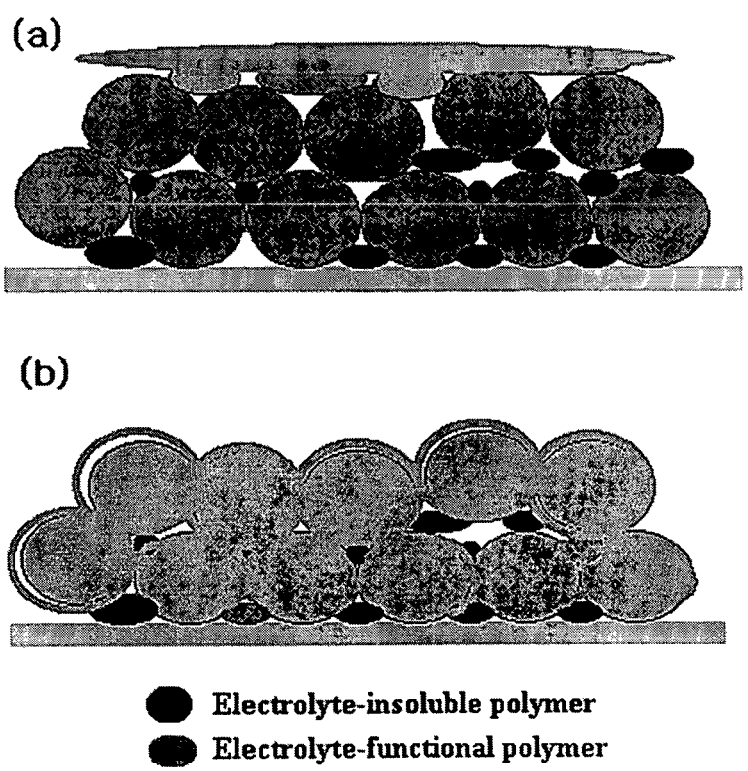
Figure 5:
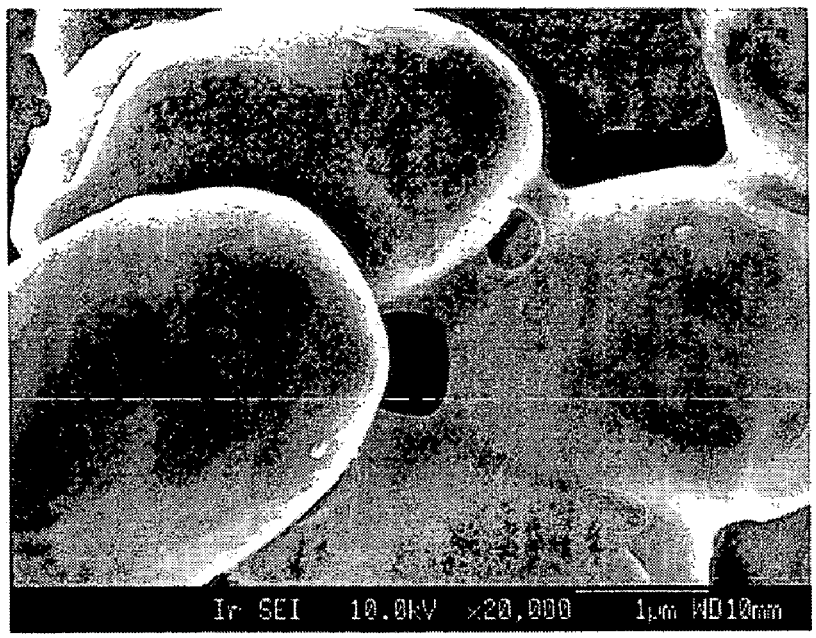
FIG. 5 is a photograph taken by SEM (scanning electron microscope) showing the structure of an electrode according to Example 3, wherein the surface of electrode active material is coated with a polymer (polymethylmethacrylate, PMMA) as an independent phase.
Figure 5:
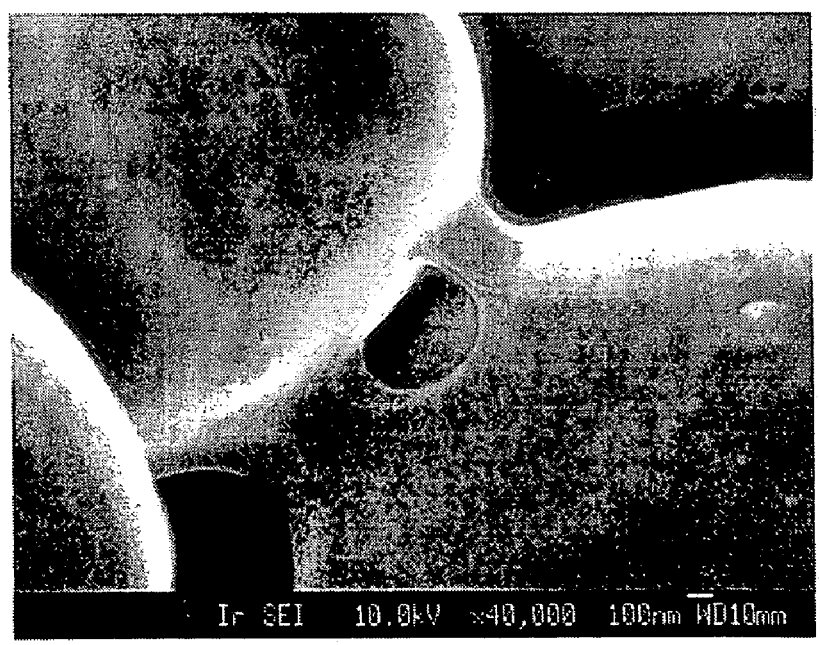

As shown in FIGS. 2*b* and 5, in the electrode manufactured as described above, the polymer coated on the electrode active material is not mixed physically with a binder but is present as an independent phase on the surface of electrode active material, while maintaining the porosity resulting from the spaces among the electrode active material particles. Therefore, it is possible to improve battery safety and performance.

Further, the present invention provides an electrochemical device including a cathode, an anode, a separator interposed between the cathode and the anode, wherein the cathode, anode or both electrodes are coated with a polymer present on the interconnected surface of electrode active material as an independent phase, while maintaining the pore structure formed among the electrode active material particles.

The electrochemical device includes all devices in which electrochemical reactions are performed. Particular examples of the electrochemical device include all kinds of primary batteries, secondary batteries, fuel cells, solar cells and capacitors.

In order to manufacture an electrochemical device by using the above-described electrode, any conventional methods known to one skilled in the art may be used. In one embodiment, the electrochemical device is produced by a method comprising the steps of interposing a separator between both electrodes to form an assembly and injecting an electrolyte into the assembly.

Adhesion of the electrode according to the present invention to a separator largely depends on the physical properties of the polymer coated on the surface of the electrode. In fact, adhesion of the electrode to a separator is made properly under the conditions of high polarity, low glass transition temperature(Tg) or low melting temperature(Tm) of the polymer. Therefore, it is possible to perform winding, lamination and folding processes to perform adhesion of the electrode to a separator. As a result, electrochemical devices can be manufactured by various methods.

When the electrode coated with a polymer, preferably an electrolyte-swellable and/or electrolyte-soluble polymer on the interconnected surface of electrode active material and a separator are assembled to form an assembly and then a liquid electrolyte is injected into the assembly, the polymer coated on the surface of electrode active material are swelled and/or dissolved depending on physical properties of the polymer.

Particularly, when the polymer coated on the surface of electrode active material is an electrolyte-swellable and electrolyte-soluble polymer, the polymer may contain a liquid electrolyte upon injection of the liquid electrolyte. Preferably, the content of the liquid electrolyte in the polymer ranges from 0.1 wt % to 20 wt % based on the weight of the polymer not incorporating the polymer, but is not limited thereto. The content may be varied depending on the polymer to be used, the kind of the solvent, the viscosity of the liquid electrolyte and the porosity of the electrode with the proviso that the content is not higher than such concentration as to completely fill the pores among the electrode active material particles.

When an electrolyte-soluble polymer is used, the polymer is dissolved upon injection of a liquid electrolyte to form a high-viscosity electrolyte. Particularly, the high-viscosity electrolyte comprises the polymer preferably in an amount of 0.01 wt % to 20 wt % based on the composition of the liquid electrolyte before the liquid electrolyte has been introduced into the electrochemical device. When the polymer content is more than 20 wt %, there are problems in that it takes too long time to dissolve the polymer in the electrolyte and that the electrolyte-soluble polymer may not be dissolved completely in the electrolyte in a predetermined time, thereby degrading battery performance.

Preferably, the viscosity of the high-viscosity electrolyte is greater than that of the liquid electrolyte in which the polymer is not dissolved, by 0.01 cP or more at 25° C.

Additionally, it is preferable that when the external temperature increases, the heat value of the electrode to the electrolyte in the electrochemical device including the high-viscosity electrolyte is lower than that of a conventional battery by 0.01 J/g or more. Further, it is preferable that the temperature where the calorific value reaches the maximum value increases by 0.01° C. or more compared to a conventional electrochemical device.

Preferably, the electrochemical device obtained from the above-described method is a lithium secondary battery, wherein the lithium secondary battery includes a lithium metal secondary battery, lithium ion secondary battery, lithium polymer secondary battery, lithium ion polymer secondary battery, etc.

The electrode according to the present invention, which is coated with a polymer as an independent phase while maintaining the pore structure among the electrode active material particles, may be formed by applying electrode active material on a current collector according to a method known to one skilled in the art. Particularly, cathode active material may include any conventional cathode active material currently used in a cathode of a conventional electrochemical device. Particular non-limitative examples of the cathode active material include lithium intercalation materials such as lithium manganese oxides, lithium cobalt oxides, lithium nickel oxides, lithium iron oxides or composite oxides thereof. Additionally, anode active material may include any conventional anode active material currently used in an anode of a conventional electrochemical device. Particular non-limitative examples of the anode active material include lithium intercalation materials such as lithium metal, lithium alloys, carbon, petroleum coke, activated carbon, graphite or other carbonaceous materials. Non-limitative examples of a cathode current collector include foil formed of aluminum, nickel or a combination thereof. Non-limitative examples of an anode current collector include foil formed of copper, gold, nickel, copper alloys or a combination thereof.

The liquid electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $ASF_6^-$, $CH_3CO_2^-$, $CF_3SO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte that may be used in the present invention is not limited to the above examples.

Although there is no particular limitation in the separator that may be used in the present invention, it is preferable to use porous separators including polypropylene-, polyethylene- or polyolefin-based porous separators. Additionally, according to the present invention, the separator can be coated with the polymer, preferably electrolyte-soluble polymer by the same method as described above with regard to the method of manufacturing electrodes.

The electrochemical device obtained from the above method may have a cylindrical, prismatic, pouch-like or a coin-like shape, but there is no particular limitation in shape of the electrochemical device.

BEST MODE FOR CARRYING OUT THE INVENTION

Reference will now be made in detail to the preferred embodiments of the present invention. It is to be understood that the following examples are illustrative only and the present invention is not limited thereto.

REFERENCE EXAMPLE 1

Measure of Viscosity and Ion Conductivity of Electrolyte Containing Polymer Dissolved Therein Viscosity and ion conductivity of an electrolyte were measured, while varying the concentration of an electrolyte-soluble polymer.

In this example, the electrolyte-soluble polymer was cyanoethyl pullulan, and the electrolyte was a mixed organic solvent of EC/PC/DEC (weight ratio=3/2/5) containing 1M of $LiPF_6$ dissolved therein. The concentration of cyanoethyl pullulan in the electrolyte was controlled to 0 wt %, 5 wt % and 10 wt %.

Figure 4:
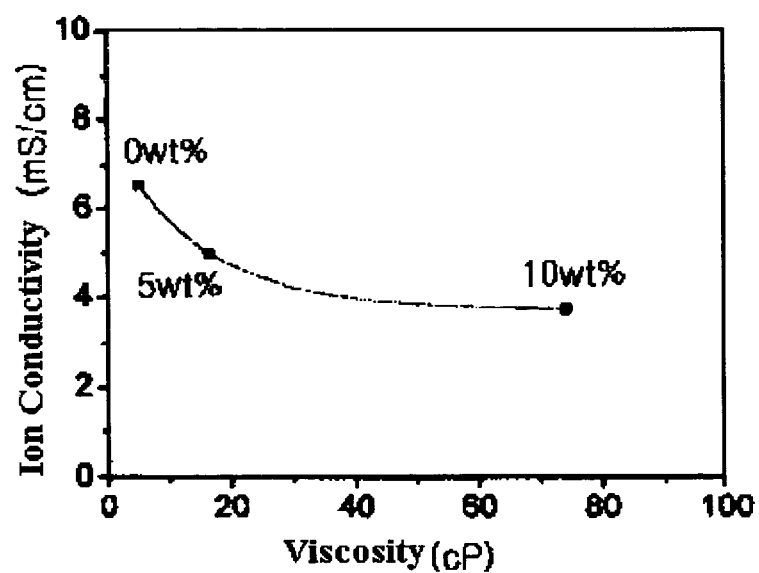
FIG. 4 is a graph showing the relationship between the variation in concentrations of an electrolyte-soluble polymer and the viscosity and ion conductivity of an electrolyte.

Variations in viscosity and ion conductivity depending on concentrations of cyanoethyl pullulan were visually monitored. The results are shown in the following Table 1 and FIG. 4. As shown in Table 1 and FIG. 4, as a small amount of an electrolyte-soluble polymer, i.e., cyanoethyl pullulan is dissolved, viscosity of the electrolyte increases significantly, but ion conductivity decreases very slightly.

TABLE 1

| Concentration of electrolyte-functional polymer dissolved in electrolyte | η (cP) | σ (mS/cm) |
|---|---|---|
| 0 wt % | 5.2 | 6.524 |
| 5 wt % | 16.5 | 4.991 |
| 10 wt % | 74.1 | 3.729 |

EXAMPLES 1~6

Manufacture of Polymer-coated Electrode and Separator, and Lithium Secondary Battery Comprising the Same

Example 1

Manufacture of Electrode Coated with Cyanoethyl Pullulan 94 wt % of lithium cobalt composite oxide as a cathode active material, 3 wt % of carbon black as a conductive material and 3 wt % of PVDF as a binder were added to a N-methyl-2-pyrrolidone (NMP) solvent so as to produce a mixture slurry for cathode. The mixture slurry was applied on a 20 µm thick aluminum (Al) thin film as a positive current collector, and dried to produce a cathode.

Meanwhile, cyanoethyl pullulan (degree of polymerization of about 600) was dissolved in acetone for about 1 hour at about 30° C. to form a solution with a concentration of 1 wt %. The preformed cathode was dipped into the polymer solution through a dip coating method for about 1 to 3 minutes until all bubbles in the pores are evacuated, and then the coated cathode was dried under vacuum at room temperature.

1-2. Manufacture of Lithium Secondary Battery (Manufacture of Anode)

To N-methyl-2-pyrrolidone (NMP) as a solvent, 93 wt % Carbon powder as a anode active material, polyvinylidene fluoride (PVDF) as a binder, and carbon black as a conductive material were added to a N-methyl-2-pyrrolidone (NMP) solvent at amounts of 93 wt %, 6 wt % and 1 wt %, respectively, so as to produce a mixture slurry for anode. The mixture slurry was applied on a 10 µm thick copper (Cu) thin film as a negative current collector, and dried to produce an anode which was then roll-pressed.

(Assemblage of Battery)

The cathode and anode obtained as described above and a tri-layered separator formed of polypropylene/polyethylene/polypropylene (PP/PE/PP) were stacked to form an assembly, and then an electrolyte (ethylene carbonate (EC)/propylene carbonate (PC)=50/50 (v/v) containing 1 M of lithium hexafluorophosphate ($LiPF_6$)) was injected thereto to provide a battery.

Example 2

Cyanoethylpolyvinyl Alcohol

Example 1 was repeated to manufacture a cathode and battery, except that cyanoethylpolyvinyl alcohol was used as a polymer instead of cyanoethyl pullulan.

Example 3

Polymethyl Methacrylate (PMMA)

Example 1 was repeated to manufacture a cathode and battery, except that polymethyl methacrylate (PMMA) was used as a polymer instead of cyanoethyl pullulan.

Example 4

Cathode and Anode Coated with Cyanoethyl Pullulan

Example 1 was repeated to manufacture a cathode and anode, except that both cathode and anode are coated with cyanoethyl pullulan.

Example 5

Battery Including Cathode, Anode and Separator Coated with Cyanoethyl Pullulan

Cyanoethyl fluran (degree of polymerization of about 600) was dissolved in acetone and then coated on the surface of a tri-layered separator formed of PP/PE/PP through a dip coating method. After coating, the separator was dried at room temperature and at 100° C. with hot air to obtain a finished separator having a thickness of polymer coating layer of about 1 µm.

Then, Example 1 was repeated to manufacture a cathode, anode, separator and a battery, except that both electrodes and separator were coated with cyanoethyl pullulan.

Example 6

Polyethylene Glycol Dimethylether

Example 5 was repeated to manufacture a battery, except that polyethyleneglycol dimethylether (molecular weight=1,000) was used as a polymer instead of cyanoethyl pullulan.

Comparative Example 1

Manufacture of Electrodes and Lithium Secondary Battery Having No Polymer Coating Example 1 was repeated to manufacture electrodes and a battery, except that the electrodes were not coated with a polymer.

Experimental Example 1

Surface Analysis

Analysis of the surface of electrode active material in the electrode coated with a polymer according to the present invention was performed as follows.

The surface of the cathode obtained from Example 3 using polymethyl methacrylate (PMMA) as a polymer was observed by means of a scanning electron microscope (SEM).

It was shown that polymethyl methacrylate (PMMA) was coated on the surface of electrode active material to a thickness of about 10 nm uniformly, while maintaining the pore structure among electrode active material particles coated with the polymer (see FIG. 5).

Experimental Example 2

Evaluation of Thermal Stability of Lithium Secondary Batteries

To evaluate thermal stability of each of lithium secondary batteries according to Examples 1 to 6 and Comparative Example 1, the following test was performed.

Each battery was charged to 4.2 V and disassembled to separate out a cathode and then was subjected to differential scanning calorimetry (DSC) to determine thermal stability to 350° C.

Figure 6:
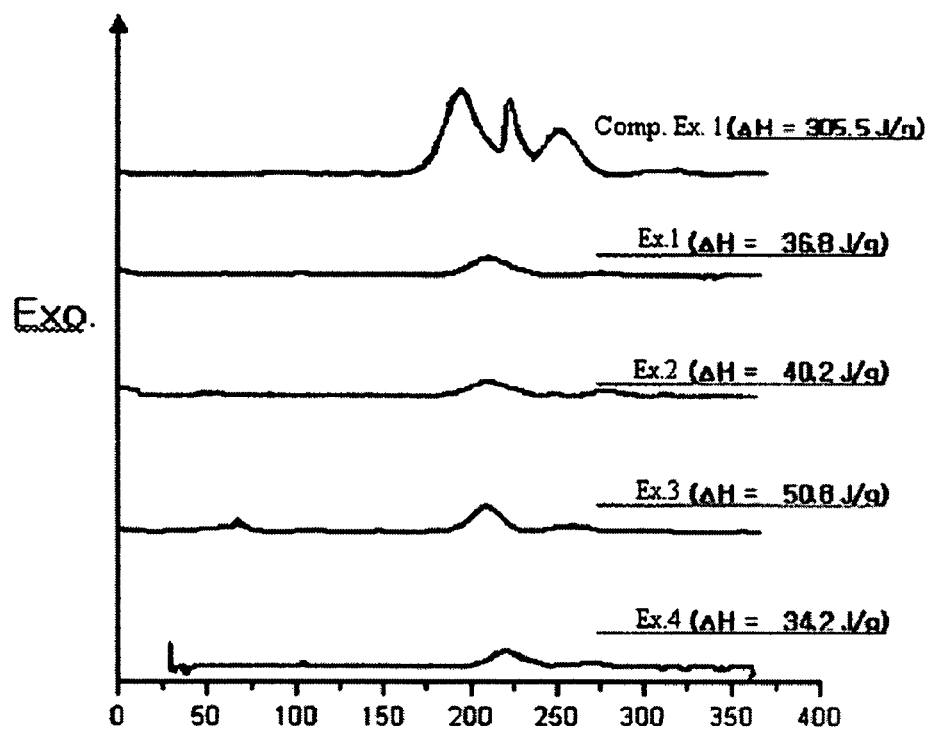
FIG. 6 is a graph showing the calorific value generated from the reaction of a cathode and an electrolyte in each lithium secondary battery according to Examples 1 to 4, including an electrode in which the surface of electrode active material is coated with a polymer as an independent phase, compared to a lithium secondary battery including a conventional electrode according to Comparative Example 1.
Figure 7:
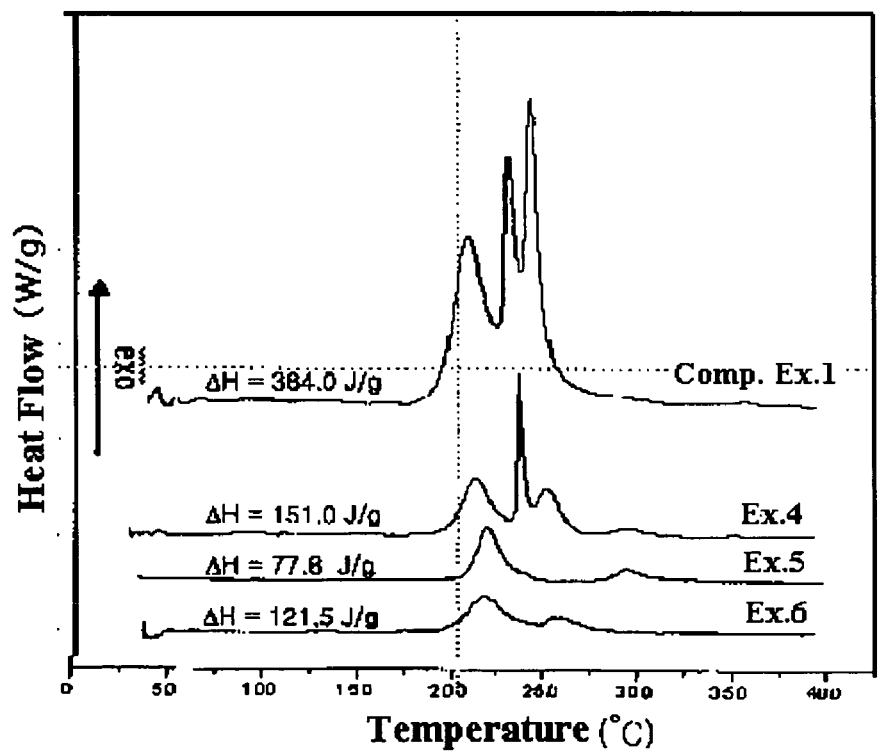
FIG. 7 is a graph showing the heat value generated from the reaction of a cathode and an electrolyte in each lithium secondary battery according to Examples 4 to 6, including an electrode in which the surface of electrode active material is coated with a polymer as an independent phase and/or a separator coated with the polymer, compared to a lithium secondary including a conventional electrode and separator battery according to Comparative Example 1.

It was shown that each of the lithium secondary batteries of examples 1 to 6 according to the present invention has improved thermal stability compared to the battery according to Comparative Example 1 (see FIGS. 6 and 7). Because the electrode according to the present invention includes a polymer coating layer present on the surface of electrode active material as an independent phase, the electrode contacts not with highly reactive electrolyte but with the polymer under extreme conditions such as overcharge and high-temperature storage. Therefore, the heat value generated from side reactions between electrode and electrolyte decreases, resulting in improvement in battery safety. In addition to this, the polymer, preferably electrolyte-soluble polymer coated on the surface of electrode active material is dissolved in the liquid electrolyte to form a high-viscosity electrolyte, thereby preventing side reactions between electrode and electrolyte and improving battery safety.

Accordingly, it can be seen that the lithium secondary battery including an electrode coated with a polymer present on the surface of electrode active material as an independent phase, while maintaining the pore structure among electrode active material particles, has excellent thermal stability.

Experimental Example 3

Evaluation of Performance of Lithium Secondary Battery

To evaluate the performance of each of lithium secondary batteries according to Examples 1 to 6 and Comparative Example 1, capacity and C-Rate of each battery were measured.

Figure 8:
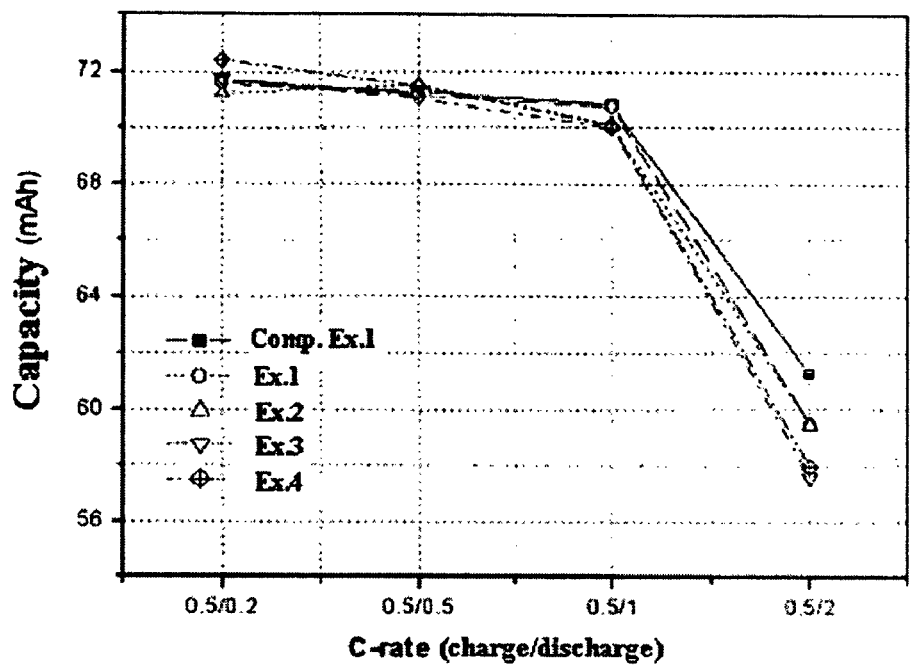
FIG. 8 is a graph showing the charge/discharge capacity of each lithium secondary battery according to Examples 1 to 4, including an electrode in which the surface of electrode active material is coated with a polymer as an independent phase, compared to a lithium secondary battery including a conventional electrode according to Comparative Example 1.
Figure 9:
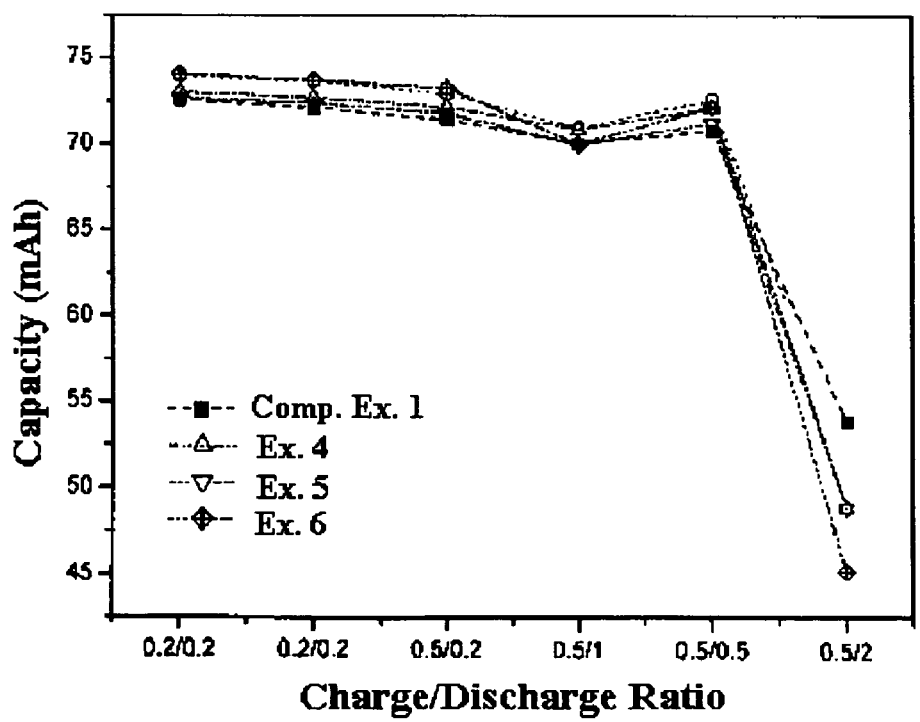
FIG. 9 is a graph showing the charge/discharge capacity of each lithium secondary battery according to Examples 4 to 6, including an electrode in which the surface of electrode active material is coated with a polymer as an independent phase and/or a separator coated with the polymer, compared to a lithium secondary battery including a conventional electrode and separator according to Comparative Example 1.

It was shown that each of batteries according to Examples 1 to 6 provides substantially equal performance compared to a battery using a conventional electrode according to Comparative Example 1, except that the former batteries show slightly decreased performance compared to the latter battery only in the discharge test at 2C (see FIGS. 8 and 9). Particularly, each of batteries according to Examples 4 to 6 wherein both electrodes are coated with polymers showed the initial capacity increased by about 3%. It is considered that such capacity increase may result from a decrease in irreversible capacity of anode due to the polymer, i.e., electrolyte-swellable or electrolyte-soluble polymer coated on the surface of anode active material.

Accordingly, it can be seen that the electrode coated with a polymer, particularly electrolyte-swellable and/or electrolyte-soluble polymer present on the surface of electrode active material as an independent phase, while maintaining the pore structure among electrode active material particles, prevents degradation of performance of lithium secondary batteries.

INDUSTRIAL APPLICABILITY

As can be seen from the foregoing, the electrode obtained by coating an electrolyte-functional polymer that is swelled and/or solubilized by a liquid electrolyte on the surface of electrode active material as an independent phase, while maintaining the pore structure among the electrode active material particles, improves safety of a battery and prevents degradation of battery performance.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. An electrode in which an electrode active material particles as being electrically interconnected are applied on a current collector with a binder, wherein the surface of the interconnected electrode active material particles is coated with an electrolyte-soluble polymer, which is soluble with liquid electrolyte to be used, the electrolyte-soluble polymer being present as a phase independent from the binder, while maintaining a pore structure formed among the interconnected electrode active material particles, wherein said electrolyte-soluble polymer is at least one selected from the group consisting of cyanoethyl pullulan, cyanoethyl polyvinyl alcohol, cyanoethyl cellulose and cyanoethyl sucrose.

2. The electrode according to claim 1, wherein the electrolyte-soluble polymer has a dielectric constant (measured at a frequency of 1 kHz) ranging from 1.0 to 100.

3. The electrode according to claim 1, wherein the electrolyte-soluble polymer is used as a mixture with at least one selected from the group consisting of polyvinylidene fluoride-hexafluoropropylene, polyvinylidene fluoride-trichloroethylene, polymethyl methacrylate, polyacrylonitrile, polyacrylonitrile-styrene copolymer, polyvinyl chloride (PVC), polyvinyl pyrrolidone, polyvinyl acetate, polyethylene-vinyl acetate copolymer and gelatin, each of which is a swellable polmer depending on the kind of liquid electrolyte to be used.

4. The electrolyte according to claim 3, wherein the electrolyte-soluble or electrolyte-swellable polymer has a solubility parameter ranging from 18.0 $(J^{1/2}/cm^{3/2})$ to 30 $(J^{1/2}/cm^{3/2})$ depending on the kind of liquid electrolyte to be used.

5. The electrode according to claim 1, wherein the polymer coating layer has a thickness ranging from 1 nm to 1 μm.

6. The electrode according to claim 1, wherein the electrode has a porosity ranging from 1% to 50%.

7. An electrochemical device including a cathode, an anode, a separator interposed between both electrodes and a liquid electrolyte, wherein the cathode, anode or both electrodes are electrodes according to claim 1, the electrode being coated with said electrolyte-soluble polymer present on an interconnected surface of electrode active material as an independent phase, while maintaining a pore structure formed among the interconnected electrode active material particles.

8. The electrochemical device according to claim 7, wherein the electrochemical device is a lithium secondary battery.

9. The electrochemical device according to claim 7, wherein the liquid electrolyte includes a salt represented by the following formula (I), the salt being dissolved or dissociated in at least one organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC) and gamma-butyrolactone:

$$A^+B^- \qquad (I)$$

wherein $A^+$ represents an alkali metal cation or a combination thereof, and $B^-$ represents an anion or a combination thereof.

10. The electrochemical device according to claim 7, wherein the polymer coated on the surface of electrode active material as an independent phase is swelled and/or dissolved by incorporation of liquid electrolyte upon injection of the liquid electrolyte, so as to form a part of electrolyte.

11. The electrochemical device according to claim 10, wherein the polymer coated on the surface of electrode active material as an independent phase contains the liquid electrolyte in an amount of 0.1 wt %-20 wt %, after injection of the liquid electrolyte.

12. The electrochemical device according to claim 10, wherein the electrolyte formed by dissolution of the polymer coated on the surface of electrode active material as an independent phase, upon injection of the electrolyte, comprises the polymer at an amount of 0.01-20 wt % based on the composition of the liquid electrolyte before the liquid electrolyte has been introduced into the electrochemical device.

13. The electrochemical device according to claim 10, wherein the electrolyte formed by dissolution of the polymer coated on the surface of electrode active material as an independent phase infiltrates uniformly into surfaces of both electrodes of the electrochemical device, pores present in the electrode active material or in the electrodes, surface of a separator and pores of a separator.

14. The electrode according to claim 1, wherein said electrolyte-soluble polymer is dissolved after injection of the liquid electrolyte so as to form a part of the electroyte, whose viscosity is at least 0.01 cP higher at 25° C. than that of the electrolyte before the electrolyte-soluble polymer is dissolved by the liquid electrolyte.

15. The electrode according to claim 14, wherein said viscosity is from 0.01 cP to 74.1 cP higher at 25° C. than that of the electrolyte before the electrolyte-soluble polymer is dissolved by the liquid electrolyte.

* * * * *